J. JONES.
Improvement in Horse Hay-Forks.
No. 129,237. Patented July 16, 1872.
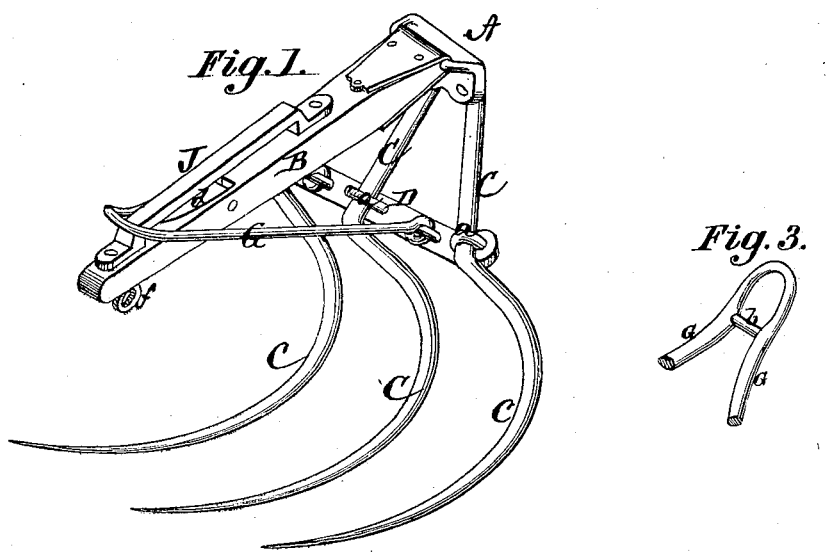
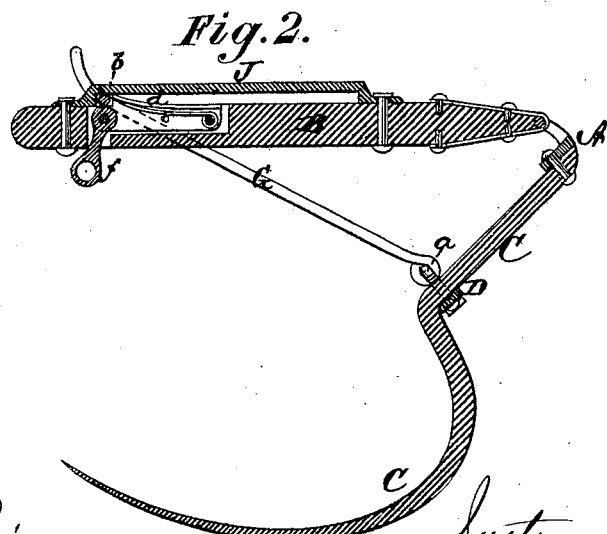

129,237

UNITED STATES PATENT OFFICE.

JUSTUS JONES, OF BURTONVILLE, NEW YORK.

IMPROVEMENT IN HORSE HAY-FORKS.

Specification forming part of Letters Patent No. 129,237, dated July 16, 1872.

SPECIFICATION.

*To all whom it may concern:*

Be it known that I, JUSTUS JONES, of Burtonville, in the county of Montgomery and State of New York, have invented certain new and useful Improvements in Horse Hay-Forks; and I do hereby declare that the following is a full, clear, and exact description thereof, reference being had to the accompanying drawing and to the letters of reference marked thereon which form a part of this specification.

The nature of my invention consists in the construction and arrangement of a "horse hay-fork," as will be hereinafter more fully set forth.

In order to enable others skilled in the art to which my invention appertains to make and use the same, I will now proceed to describe its construction and operation, referring to the annexed drawing, in which—

Figure 1 is a perspective view, and Fig. 2 a longitudinal section, of my improved horse hay-fork; and Fig. 3 is a perspective view of the head of the bail.

A represents the head of my hay-fork, pivoted or hinged to the handle B. To the head A are firmly secured three tines, C C, the side tines being at an angle with the middle tine, so as to make them flaring, as shown. These tines are straight for a suitable distance, and pass through loops $a a$ riveted or otherwise fastened to a cross-bar, D, which thus connects the tines and holds them apart. From this cross-bar the tines are curved, as shown, and their ends pointed. To eyebolts or in eyebolts on the under side of the cross-bar D is hinged a bail, G, which passes up and on the outer side of the handle B. Near this end the two sides of the bail are connected by a cross-bar, $b$, which passes under a guard, J, attached to the outer side of the handle, so that in the movement of the fork this bail with its cross-bar will slide up and down, the handle being held to it by said guard. In a longitudinal recess in the handle B is pivoted a latch, $d$, which is forced outward toward the guard J by a spring, $e$, so that as the fork, or, rather, the tines, are raised and the bail slides up the handle, and the cross-bar $b$ comes to the upper end of the guard, it will be caught by the latch, thus locking the fork in position to hoist the load. At the upper end of the latch $d$ is pivoted a trigger, $f$, passing through a mortise in the head to the under side thereof, and to the end of the trigger the trip-rope is attached.

It will be seen that in the working of this hay-fork it turns on the joint connecting the bail G to the cross-bar D, the hoisting-rope being attached at the upper end of the bail. The tines being thrust into the hay, the handle is pressed down until the fork becomes locked, as above described. In the hoisting of the load it will be noticed that the trigger is in such a position that it cannot strike any beam or other obstruction and become accidentally unfastened. By pulling on the trip-rope the tines fall down, unloading the hay. When the handle is thus extended the fork is very convenient for gathering up the scattered hay.

By pivoting the bail G to the cross-bar D at a point below the pivot of the handle B, and by placing the latch $d$ in the upper end of the handle B, I produce a much stronger implement and with fewer parts, making the same more simple and less expensive than by using these parts in a reversed position, as heretofore made; and as the fork is raised by the bail the handle is relieved from all direct strain, and used simply as a brace between the bail and the head of the fork.

Having thus fully described my invention, what I claim as new, and desire to secure by Letters Patent, is—

The bail G, constructed as described, combined with the handle B, guard J, latch $d$, tines, C, and bar D, the several parts being arranged as shown and described, and for the purpose specified.

In testimony that I claim the foregoing as my own I affix my signature in presence of two witnesses.

JUSTUS JONES.

Witnesses:
　D. C. CHASE,
　J. L. CHASE.